United States Patent
Chuang et al.

(10) Patent No.: US 9,246,388 B2
(45) Date of Patent: *Jan. 26, 2016

(54) INTEGRATED CIRCUIT FOR CONVERTING A HIGH VOLTAGE LEVEL TO A LOW VOLTAGE LEVEL

(71) Applicant: TAIWAN SEMICONDUCTOR MANUFACTURING COMPANY, LTD., Hsinchu (TW)

(72) Inventors: Mei-Chen Chuang, Xinyuan Township (TW); Alan Roth, Leander, TX (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,485

(22) Filed: May 30, 2014

(65) Prior Publication Data

US 2014/0266097 A1    Sep. 18, 2014

Related U.S. Application Data

(63) Continuation of application No. 13/953,909, filed on Jul. 30, 2013, now Pat. No. 8,773,093, which is a continuation of application No. 12/877,535, filed on Sep. 8, 2010, now Pat. No. 8,519,684.

(51) Int. Cl.
G05F 1/40 (2006.01)
H02M 3/158 (2006.01)
H05B 33/08 (2006.01)
H02M 3/157 (2006.01)
G05F 1/46 (2006.01)

(52) U.S. Cl.
CPC .............. *H02M 3/158* (2013.01); *H02M 3/157* (2013.01); *H02M 3/1588* (2013.01); *H05B 33/0815* (2013.01); *G05F 1/462* (2013.01); *Y02B 70/1466* (2013.01)

(58) Field of Classification Search
CPC ............. G05F 1/08; G05F 1/52; G05F 1/595; G05F 1/462; G05F 1/565
USPC ......... 323/222, 225, 268, 271, 282, 284, 285; 307/108, 111, 112
See application file for complete search history.

(56) References Cited

U.S. PATENT DOCUMENTS

| | | | |
|---|---|---|---|
| 5,159,273 A | 10/1992 | Wright et al. | |
| 5,160,855 A | 11/1992 | Dobberpuhl | |
| 5,191,244 A | 3/1993 | Runaldue et al. | |
| 5,285,119 A | 2/1994 | Takahashi | |
| 5,422,591 A | 6/1995 | Rastegar et al. | |
| 6,388,475 B1 | 5/2002 | Clark et al. | |
| 7,000,128 B1 | 2/2006 | Broach | |
| 7,741,820 B2 * | 6/2010 | Huang et al. | 323/271 |
| 8,258,763 B2 * | 9/2012 | Nakamura et al. | 323/271 |

(Continued)

*Primary Examiner* — Matthew Nguyen
(74) *Attorney, Agent, or Firm* — Hauptman Ham, LLP

(57) ABSTRACT

An integrated circuit for converting a high voltage level to a low voltage level comprises a high side driver, a low side driver electrically coupled with the high side driver, a circuit electrically coupled with the high side driver and a first node between the high side driver and the low side driver, and a false signal filter electrically coupled with the circuit. The circuit is configured to substantially turn off the high side driver if the high side driver leaves a cutoff region of the high side driver during a tri-state mode. The false signal filter is configured to screen signals that are outside of the tri-state mode.

20 Claims, 6 Drawing Sheets

(56) References Cited

U.S. PATENT DOCUMENTS

| | | |
|---|---|---|
| 8,519,684 B2 | 8/2013 | Chuang et al. |
| 2005/0225259 A1 | 10/2005 | Green |
| 2009/0278723 A1 | 11/2009 | Chuang et al. |
| 2014/0253061 A1* | 9/2014 | Yang et al. .................... 323/271 |

* cited by examiner

INTEGRATED CIRCUIT FOR CONVERTING A HIGH VOLTAGE LEVEL TO A LOW VOLTAGE LEVEL

PRIORITY CLAIM

The present application is a continuation of U.S. application Ser. No. 13/953,909, filed Jul. 30, 2013, now U.S. Pat. No. 8,773,093, which is a continuation of U.S. application Ser. No. 12/877,535, filed Sep. 8, 2010, now U.S. Pat. No. 8,519,684, which are incorporated herein in their entireties.

TECHNICAL FIELD

The present disclosure relates generally to the field of semiconductor technology and, more particularly, to an integrated circuit for converting a high voltage level to a low voltage level.

BACKGROUND OF THE DISCLOSURE

Light-emitting diodes (LEDs) are semiconductor light sources and have been used to replace conventional fluorescent lamp sources. Conventionally, LEDs are semiconductor diodes made from compound materials. If the diodes are forward biased, electrons supplied from a node recombine with holes supplied from another node, releasing energy in the form of photons. By selecting the compound materials, emission colors of the LEDs can vary from red to blue.

BRIEF DESCRIPTION OF THE DRAWINGS

The present disclosure is understood from the following detailed description when read with the accompanying figures. It is emphasized that, in accordance with the standard practice in the industry, various features are not drawn to scale and are used for illustration purposes only. In fact, the numbers and dimensions of the various features may be arbitrarily increased or reduced for clarity of discussion.

DETAILED DESCRIPTION OF THE DISCLOSURE

Figure 1A:
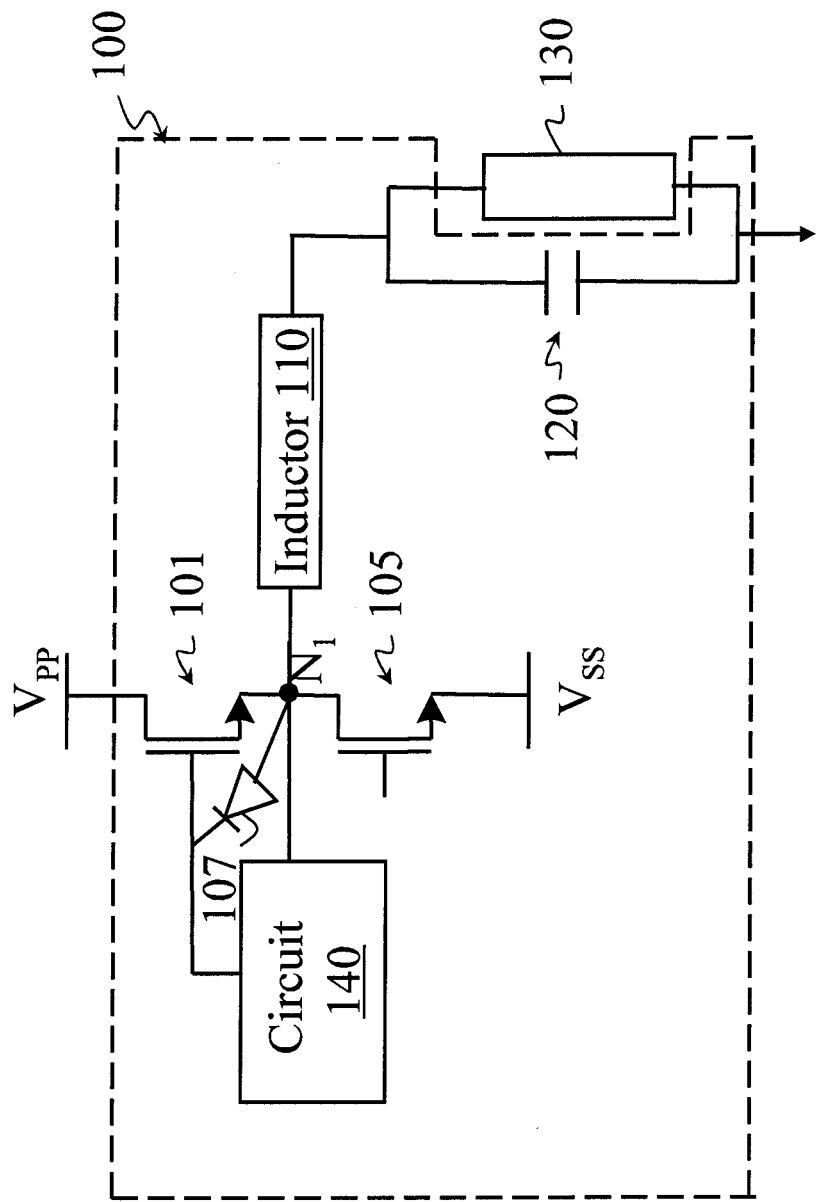
FIG. 1A is a schematic drawing illustrating a first exemplary integrated circuit for converting a high voltage level to a low voltage level.

A buck converter is used to convert a high voltage to a low voltage that is deployed to light an LED. A buck converter has a high side driver and a low side driver. An input end of an inductor is electrically coupled to a node between the high side driver and the low side driver. An output end of the inductor is electrically coupled with the LED. By providing different voltage states to gates of the high side driver and the low side driver, energy stored in the inductor can be charged or discharged through the high side driver and the low side driver, respectively. The energy charge or discharge of the inductor can provide a constant voltage on the output end of the inductor.

In a dimming mode, the gate of the high side driver is floating and the low side driver is turned off. It is found that the current of the LED may pull down the voltage level on the node between the high side driver and the low side driver. The pulled-down voltage level may trigger the turn-on of the high side driver, resulting in a current leakage from the power voltage $V_{PP}$ to the inductor and the LED. The current leakage results in a power loss and/or a wrong current flowing to the LED It is understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1A is a schematic drawing illustrating an integrated circuit for converting a high voltage level to a low voltage level. In FIG. 1A, an integrated circuit 100 can be a buck converter, a direct current-to-direct current (DC-to-DC) converter, or any electrical circuit that is configured to convert a high voltage level to a low voltage level. For example, the electrical circuit can be configured to convert a high voltage level, e.g., power voltage $V_{PP}$, on a power line to a low voltage level on a node between an inductor 110 and an electrical load 130.

In some embodiments, the integrated circuit 100 can include a high side driver 101 that is electrically coupled with a low side driver 105. At least one electrical load, e.g., an electrical load 130, can be directly or indirectly electrically coupled with a node $N_1$ between the high side driver 101 and the low side driver 105. A circuit 140 can be electrically coupled with the high side driver 101 and the node $N_1$. The circuit 140 can be configured to substantially turn off the high side driver 101 if the high side driver 101 leaves a cutoff region of the high side driver 101 during a tri-state mode.

In some embodiments, the high side driver 101 can be electrically coupled with a power line that is configured to provide a power voltage, e.g., a power voltage $V_{PP}$. The power voltage $V_{PP}$ can range from about tens of volts to about hundreds of volts. The low side driver 105 can be electrically coupled with another power line that is configured to provide a power voltage, e.g., a power voltage $V_{SS}$ or ground. The power voltage $V_{PP}$ is higher than the power voltage $V_{SS}$.

In some embodiments, the electrical load 130 can be a light-emitting diode (LED), a liquid crystal display (LCD) pixel, or any electrical diode. Though merely showing an electrical load 130 in FIG. 1A, the scope of the present application is not limited thereto. In some embodiments, more than one electrical load can be used. The more than one electrical load can be electrically coupled with each other in a parallel fashion or in a serial fashion.

In some embodiments using an LED, an inductor 110 and/or a capacitor 120 can be electrically coupled with the electrical load 130. The inductor 110 can be electrically coupled between the node $N_1$ and the electrical load 130. The capacitor 120 can be electrically coupled with the electrical load 130 in a parallel fashion. It is noted that the configuration and the number of the inductor 110 and the capacitor 120 are merely exemplary. Configurations and numbers of inductors and/or capacitors may be modified.

In some embodiments using an LED, the operation of the integrated circuit 100 can include a normal operation mode and a tri-state mode, e.g., a dimming mode. During the normal operation mode, different voltage states can be applied to gates of the high side driver 101 and the low side driver 105. The on/off switching of the high side driver 101 and the low side driver 105 can charge or discharge energy stored in the inductor 110 and/or the capacitor 120. With the energy charge or discharge of the inductor 110 and/or the capacitor 120, a substantially constant voltage can be provided on the node (not labeled) between the inductor 110 and the electrical load 130 for operations of the electrical load 130.

During the tri-state mode, the high side driver 101 and the low side driver 105 are off. In some embodiments, a clamper 107 can be electrically coupled between the gate and the source of the high side driver 101, clamping the voltage drop, e.g., 5 V, across the gate and the source of the high side driver 101. The clamper 107 can be configured to prevent the gate-source voltage drop that is too high and may compromise the high side driver 101. In at least this embodiment, the gate of the high side driver 101 can be floating during the tri-state mode, such that the voltage level on the gate of the high side driver 101 can follow the voltage level on the source of the high side driver 101. In some embodiments, the clamper 107 can be an external diode or an intrinsic diode of the high side driver 101. It is noted that the clamped voltage drop across the gate and source of the high side driver 101 is merely exemplary. The clamped voltage drop can be modified.

Figure 1B:
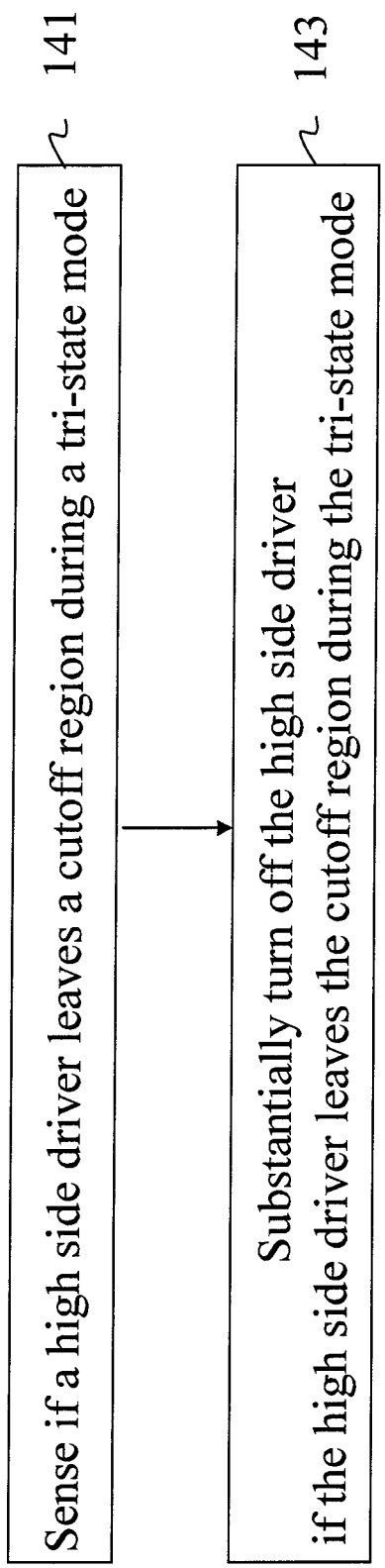
FIG. 1B is a schematic flowchart illustrating a method of operating an exemplary integrated circuit for converting a high voltage level to a low voltage level.

As noted, the circuit 140 can be configured to substantially turn off the high side driver 101 if the high side driver 101 leaves the cutoff region during the tri-state mode. In some embodiments, the circuit 140 can be configured to sense if the high side driver 101 leaves the cutoff region of the high side driver 101 during a tri-state mode (step 141 as shown in FIG. 1B). If the high side driver leaves the cutoff region, a current leakage may flow from the power voltage $V_{PP}$ to the inductor 110 and the capacitor 120 through the high side driver 101.

The circuit 140 can be configured to substantially turn off the high side driver 101 if the high side driver 101 leaves the cutoff region during the tri-state mode (step 143 shown in FIG. 1B). By substantially turning off the high side driver 101 during the tri-state mode, the power voltage $V_{PP}$ can be substantially electrically isolated from the node $N_1$. The turned-off high side driver 101 can substantially cut off the leakage path from the power voltage $V_{PP}$ to the inductor 110 through the high side driver 101. In some embodiments, the term "substantially turning off the high side driver 101" here can mean that the voltage level on the gate of the high side driver 101 can be pulled down to ground or a power voltage $V_{SS}$ that is lower than the voltage level on node $N_1$. In other embodiments, the term "substantially turning off the high side driver 101" here can mean that the voltage level on the gate of the high side driver 101 can be pulled down such that a voltage difference between the gate and source of the high side driver 101 is lower than a threshold voltage of the high side driver 101. By turning off the high side driver 101, a power loss and/or a wrong LED current resulting from the current leakage on the high side driver during the tri-state mode can be desirably reduced.

Figure 2:
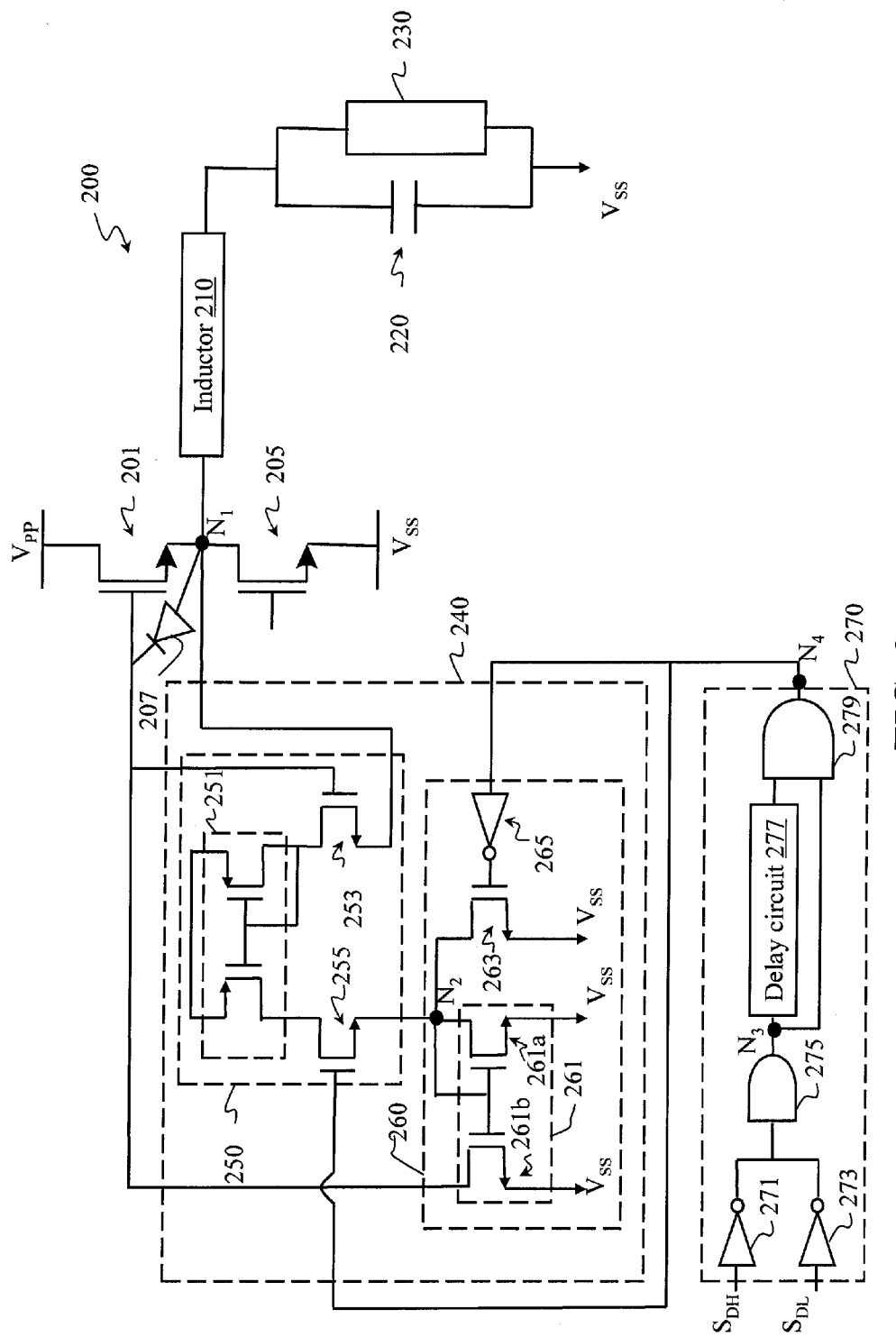
FIG. 2 is a schematic drawing illustrating a second exemplary integrated circuit for converting a high voltage level to a low voltage level.

FIG. 2 is a schematic drawing illustrating a second exemplary integrated circuit for converting a high voltage level to a low voltage level. Items of FIG. 2 that are the same or similar items in FIG. 1A are indicated by the same reference numerals, increased by 100. In FIG. 2, a circuit 240 can include a sensing circuit 250 that can be electrically coupled with a control circuit 260. In some embodiments, the sensing circuit 250 can be electrically coupled with a high side driver 201 and the node $N_1$. In other embodiments, the sensing circuit 250 can be electrically coupled with the gate of the high side driver 201. The sensing circuit 250 can be configured to sense if the high side driver 201 leaves its cutoff region during the tri-state mode.

In some embodiments, the sensing circuit 250 can include a current mirror 251 that can be electrically coupled with at least one transistor, e.g., transistors 253 and 255. The transistor 253 can be electrically coupled with the node $N_1$. In some embodiments, the gate of the transistor 253 can be electrically coupled with the gate of the high side driver 201. The transistor 255 can be electrically coupled with the control circuit 260. In some embodiments, the current mirror 251 can include a pair of P-type transistors (not labeled). The transistors 253 and 255 can be N-type transistors. It is noted that the number and type of the current mirror 251 and/or the transistors 253 and 255 shown in FIG. 2 are merely exemplary. One skilled in the art can modify the number and/or type of the current mirror and/or the transistors to achieve a desired sensing circuit.

Referring again to FIG. 2, the control circuit 260 can be configured to control the high side driver 201 corresponding to the sensing result from the sensing circuit 250 during the tri-state mode. If the high side driver 201 does not leave the cutoff region during the tri-state mode, the control circuit 260 is not triggered to turn off the high side driver 201. If the high side driver 201 leaves the cutoff region during the tri-state mode, the control circuit 260 is triggered to turn off the high side driver 201.

In some embodiments, the control circuit 260 can include a current mirror 261 that can be electrically coupled with the sensing circuit 250 and the gate of the high side driver 201. The control circuit 260 can further include a switch 263 that can be electrically coupled with a node $N_2$ between the sensing circuit 250 and the current mirror 261. In some embodiments, the current mirror 261 can include a pair of N-type transistors 261a and 261b. The switch 263 can be an N-type transistor. It is noted that the number and type of the current mirror 261 and/or the switch 263 shown in FIG. 2 are merely exemplary. One of skilled in the art can modify the number and/or type of the current mirror and/or the switch to achieve a desired control circuit.

During a normal operation mode, the switch 263 can be turned on. The turned-on switch 263 can electrically couple the node $N_2$ with a power voltage, e.g., ground or the power voltage $V_{SS}$. Since the node $N_2$ can be substantially grounded, transistors 261a and 261b are turned off. The turned-off transistor 261b can electrically isolate the gate of the high side driver 201 from ground or the power voltage $V_{SS}$. The circuit 240 is free from interfering with the normal operation of the high side driver 201.

During the tri-state mode, the gate of the high side driver 201 can be floating and the low side driver 205 is turned off. A current flowing through the electrical load 230 can pull down the voltage level on the node $N_1$. Since the gate of the high side driver 201 is floating, the pulled-down voltage node $N_1$ that is electrically coupled with the source of the high side driver 201 may trigger the turn-on of the high side driver 201, such that the high side driver 201 leaves the cutoff region. The turned-on high side driver 201 can result in a current leakage flowing from the power voltage $V_{PP}$ to the capacitor 220 through the inductor 210.

In some embodiments, the transistor 253 can be substantially similar to the high side driver 201. The term "substantially similar to" here means that at least one electrical characteristic of the transistor 253 is similar to that of the high side driver 201. For example, the cutoff region and/or threshold voltage of the transistor 253 are similar to those of the high side driver 201. As noted, the gate and source of the transistor 253 are electrically coupled with the gate and source of the high side driver 201, respectively. Not only triggring the turn-on of the high side driver 201, the pulled-down voltage level on the node $N_1$ can also trigger the turn-on of the transistor 253 during the tri-state mode. The current flowing through the transistor 253 can be as same as or similar to the current leakage flowing through the high side driver 201. The current mirror 251 can mirror the current of the transistor 253 to the transistor 255. The mirrored current will be provided to the control circuit 260.

During the tri-state mode, the switch 263 of the control circuit 260 is turned off, electrically isolating the node $N_2$ from the power voltage $V_{SS}$ or ground. As noted, the current flowing through the transistor 255 can also flow through the transistor 261a during the tri-state mode. The current of the transistor 261a can be mirrored to the transistor 261b, which can electrically couple the gate of the high side driver 201 to the power voltage $V_{SS}$ or ground. By pulling down the voltage level on the gate of the high side driver 201, the high side driver 201 can be turned off. The turned-off high side driver 201 can substantially cut the leakage path between the power voltage $V_{PP}$ and the inductor 210. By cutting off the leakage path, the power loss and/or the wrong current contributed to the turn-on of the high side driver 201 during the tri-state mode can be reduced.

In some embodiments, the integrated circuit 200 can optionally include a false signal filter 270. The false signal filter 270 can be electrically coupled with the circuit 240. In other embodiments, the false signal filter 270 can be electrically coupled with the sensing circuit 250 and the control circuit 260. The false signal filter 270 can be configured to screen signals that are not representing the tri-state mode. For example, signals for driving the high side driver and the low side driver may both go low for a short period of time during the normal operation mode. The signal states during the short period of time do not represent the tri-state mode of the integrated circuit 200. The false signal filter 270 can screen the signals not representing the tri-state mode.

In some embodiments, the false signal filter 270 can be directly or indirectly electrically coupled with the switch 263 of the control circuit 260 and the transistor 255 of the sensing circuit 250. For example, the false signal filter 270 can be electrically coupled with the switch 263 through an inverter 265.

In some embodiments, the false signal filter 270 can include inverters 271 and 273, AND gates 275 and 279, and a delay circuit 277. The AND gate 275 can be electrically coupled with output nodes of the inverters 271 and 273. An output node $N_3$ of the AND gate 275 can be electrically coupled with the delay circuit 277 and the AND gate 279. An output node of the delay circuit 277 can be electrically coupled with the AND gate 279. An output node $N_4$ of the AND gate 279 can be electrically coupled with the sensing circuit 250 and the control circuit 260.

Figure 3:
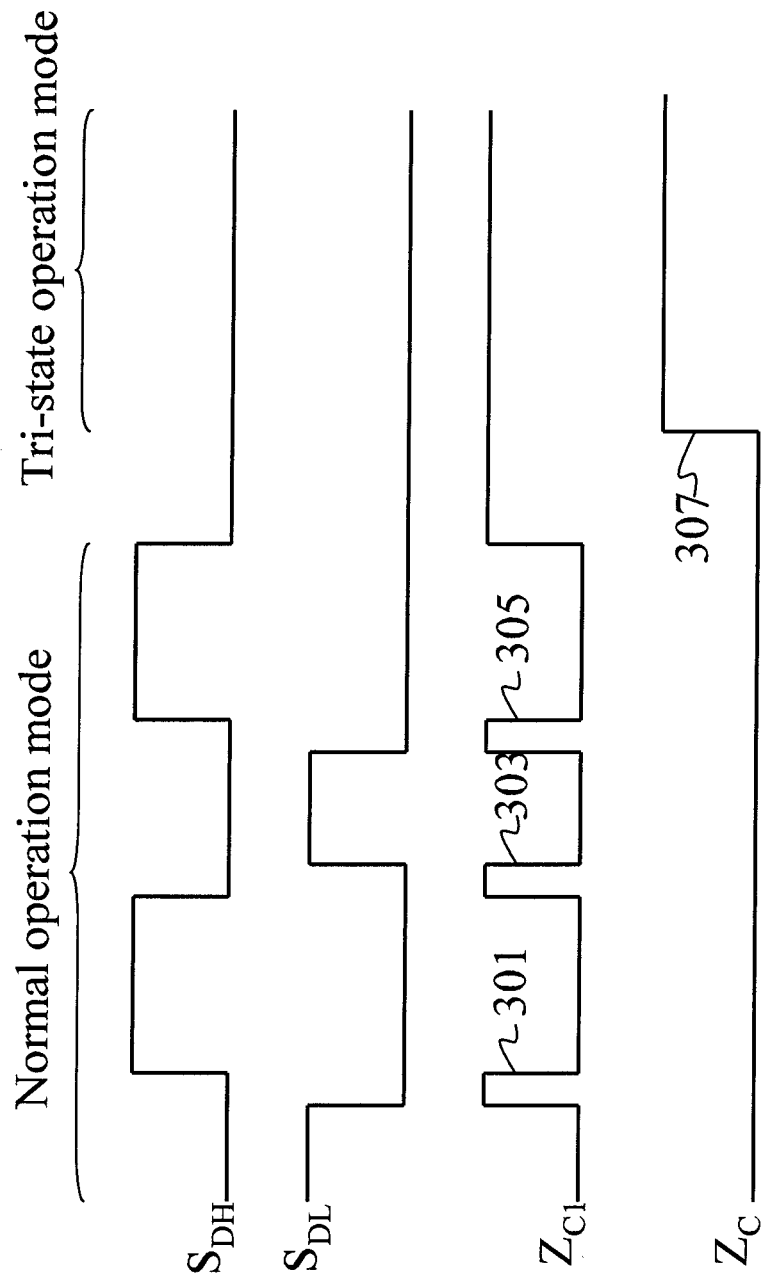
FIG. 3 is a schematic drawing illustrating waveforms of various signals.

In some embodiments, the inverters 271 and 273 can receive signal $S_{DH}$ and signal $S_{DL}$ for driving the high side driver 201 and the low side driver 205, respectively. The signal $S_{DH}$ and the signal $S_{DL}$ can be used directly or indirectly (e.g., after being processed) to drive and/or control operations of the high side driver 201 and the low side driver 205, respectively. In some embodiments, waveforms of the signal $S_{DH}$ and the signal $S_{DL}$ can be shown in FIG. 3. As shown in FIG. 3, the signals $S_{DH}$ and $S_{DL}$ both go low for short time periods during the normal operation mode.

The AND gate 275 can perform an AND operation for signals output from the inverters 271 and 273, outputting a signal $Z_{C1}$ on the output node $N_3$ of the AND gate 275. The waveform of the signal $Z_{C1}$ can be shown in FIG. 3. As shown in FIG. 3, pulses 301, 303, and 305 indicate the short time periods during which both of the signals $S_{DH}$ and $S_{DL}$ go low and are signals not representing the tri-state mode. If the pulses 301, 303, and 305 were applied to control the circuit 240 during the normal operation mode, the operations of the circuit 240 would fail.

To make sure that the voltage states of the signals $S_{DH}$ and $S_{DL}$ represents the tri-state mode, the delay circuit 277 can be configured to delay the signal $Z_{C1}$ for a predetermined period of time. The delayed signal is then output to the AND gate 279. The AND gate 279 can be configured to perform an AND operation for the delay signal from the delay circuit 277 and the signal $Z_{C1}$, outputting a signal $Z_C$ on the output node $N_4$ of the AND gate 279. The waveform of the signal $Z_C$ can be shown in FIG. 3. As shown in FIG. 3, the time period after a state transition 307 of the signal $Z_{C1}$ can represent the tri-state mode.

Referring again to FIG. 2, during the normal operation mode, the low voltage state of the signal $Z_C$ can be inverted by the inverter 265 to turn on the switch 263. The turned-on switch 263 can electrically couple the node $N_2$ to ground or the power voltage $V_{SS}$. The low voltage state on the node $N_2$ can turn off the transistors 261a and 261b, such that the gate of the high side driver 201 can be electrically isolated from ground or the voltage $V_{SS}$. The low voltage state of the signal $Z_C$ can also turn off the transistor 255, such that no current can be mirrored from the transistor 253. From the foregoing, the circuit 240 is free from interfering the voltage level on the gate of the high side driver 201.

During the tri-state mode, the high voltage state of the signal $Z_C$ can be inverted by an inverter 265 to turn off the switch 263. The turned-off switch 263 can electrically isolate the node $N_2$ from ground or the power voltage $V_{SS}$. The high voltage state of the signal $Z_C$ can also turn on the transistor 255, such that the current mirrored from the transistor 253 can flow through the transistor 261a during the tri-state mode. The current of the transistor 261a is then mirrored to the transistor 261b, pulling down the voltage level on the gate of the high side driver 201 and turning off the high side driver 201. The turned-off high side driver 201 can cut off the leakage path between the power voltage $V_{PP}$ and the inductor 210. By cutting off the leakage path, the power loss and/or wrong current due to the turn-on of the high side driver 201 during the tri-state mode can be reduced.

Figure 4:
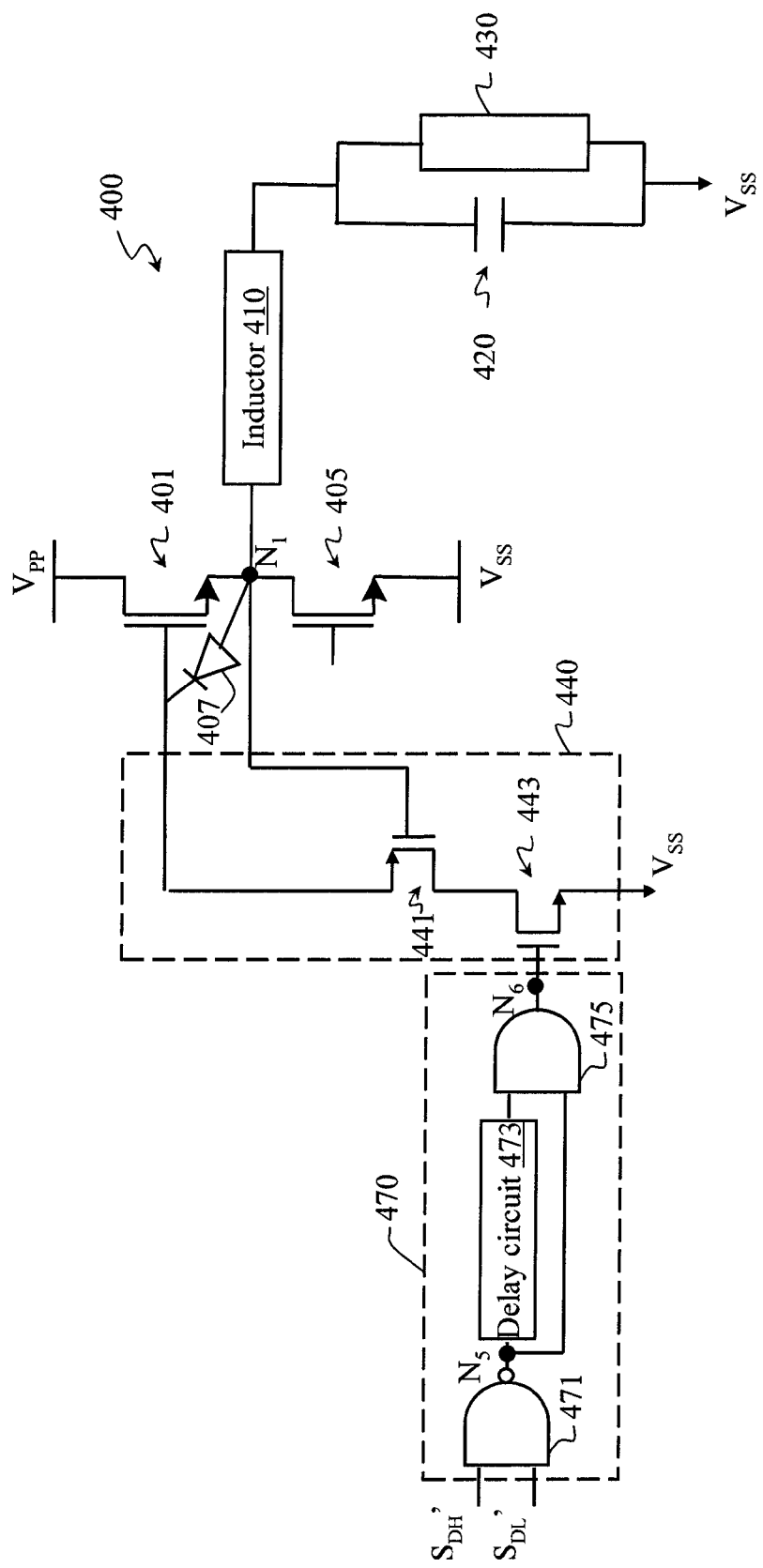
FIG. 4 is a schematic drawing illustrating a third integrated circuit for converting a high voltage level to a low voltage level.

FIG. 4 is a schematic drawing illustrating an exemplary integrated circuit for converting a high voltage level to a low voltage level. Items of FIG. 4 that are the same or similar items in FIG. 1A are indicated by the same reference numerals, increased by 300. In FIG. 4, a circuit 440 can include a transistor 441 that can be electrically coupled with a switch 443. In some embodiments, the transistor 441 is a P-type transistor and the switch 443 is an N-type transistor. In at least this embodiment, a gate of the transistor 441 can be electrically coupled with the node $N_1$. The source of the transistor 441 can be electrically coupled with a gate of a high side driver 401. A drain of the transistor 441 can be electrically coupled with the switch 443.

In some embodiments, the transistor 441 can be configured to sense if the high side driver 401 leaves the cutoff region. For example, during the tri-state mode, a gate of the high side driver 401 is floating and a low side driver 405 is turned off. As noted, the voltage level on the node $N_1$ may be pulled down due to the current leakage flowing through an electrical load 430. The pulled-down voltage level on the node $N_1$ can trigger the high side driver 401 leaving the cutoff region.

As noted, the gate and the source of the transistor 441 can be electrically coupled with the node $N_1$ and the gate of the high side driver 401, respectively. The pulled-down voltage level on the $N_1$ can also trigger the turn-on of the transistor 441. During the tri-state mode, the switch 443 is turned on. The turned-on switch 443 and the turned-on transistor 441 can electrically couple the gate of the high side driver 401 with ground or the power voltage $V_{SS}$, such that the high side driver 401 can be turned off. The turned-off high side driver 401 can cut off the leakage path between the power voltage $V_{PP}$ and the inductor 410. By cutting off the leakage path, the power loss and/or the wrong current due to the turn-on of the high side driver 401 during the tri-state mode can be reduced.

In some embodiments, the integrated circuit 400 can optionally include a false signal filter 470. In some embodiments, the false signal filter 470 can be electrically coupled with the circuit 440. In other embodiments, the false signal filter 470 can directly or indirectly electrically coupled with the switch 443. The false signal filter 470 can be configured to screen signals that are not representing the tri-state mode.

In some embodiments, the false signal filter 470 can include a NAND gate 471, a delay circuit 473, and an AND gate 475. An output node $N_5$ of the NAND gate 471 can be electrically coupled with the delay circuit 473 and the AND gate 475. An output node of the delay circuit 473 can be electrically coupled with the AND gate 475. An output node $N_6$ of the AND gate 475 can be electrically coupled with the circuit 440.

In some embodiments, the NAND gate 471 can receive signals $S_{DH}'$ and $S_{DL}'$ for driving high side driver 401 and the low side driver 405, respectively. The signals $S_{DH}'$ and $S_{DL}'$ can be used directly or indirectly (e.g., after being processed) to drive and/or control operations of the high side driver 401 and the low side driver 405, respectively. The waveforms of the signals $S_{DH}'$ and $S_{DL}'$ can be as same as or similar to those of signals $S_{DH}$ and $S_{DL}$ shown in FIG. 3, respectively.

The NAND gate 471 can perform a NAND operation for the signals $S_{DH}'$ and $S_{DL}'$, outputting a signal $Z_{C1}'$ on the output node $N_5$ of the NAND gate 471. The waveform of the signal $Z_{C1}'$ can be as same as or similar to that of the signal $Z_{C1}$ shown in FIG. 3.

To make sure that the voltage states of the signals $S_{DH}'$ and $S_{DL}'$ represents the tri-state mode, the delay circuit 473 can be configured to delay the signal $Z_{C1}'$ for a predetermined period of time. The delayed signal is then output to the AND gate 475. The AND gate 475 can be configured to perform an AND operation for the delay signal from the delay circuit 473 and the signal $Z_{C1}'$, outputting a signal $Z_C'$ on the output node $N_6$ of the AND gate 475. The waveform of the signal $Z_C'$ can be as same as or similar to the waveform of the signal $Z_C$ shown in FIG. 3.

Referring again to FIG. 4, during the normal operation mode, the low voltage state of the signal $Z_C'$ can turn off the switch 443. The turned-off switch 443 can electrically isolate the transistor 441 from ground or a power voltage $V_{SS}$, such that the circuit 440 is free from interfering with the normal operation of the high side driver 401.

As noted, if the high side driver 401 leaves the cutoff region during the tri-state mode, the transistor 441 can be turned on. During the tri-state mode, the high state of the signal $Z_C'$ can turn on the switch 443. The turned-on switch 443 can electrically couple the drain of the transistor 441 with ground or the power voltage $V_{SS}$. The turned-on transistor 441 and switch 443 can electrically couple the gate of the high side drive 401 with ground or the power voltage $V_{SS}$, such that the high side driver 401 is turned off. The turned-off high side driver 401 can cut off the leakage path between the power voltage $V_{PP}$ and the inductor 410. By cutting off the leakage path, the power loss and/or the wrong current due to the turn-on of the high side driver 401 during the tri-state mode can be reduced.

It is noted that the configurations of the false signal filters 270 and 470 are merely exemplary. Configurations and types of logic gates and/or delay circuits of the false signal filters 270 and 470 can be changed. In some embodiments, additional logic gates and/or diodes can be added to achieve the purpose of screening signals that do not represent the tri-state mode. In some embodiments, the false signal filter 470 can be used to replace the false signal filter 270 of the integrated circuit 200, vice versa.

Figure 5:
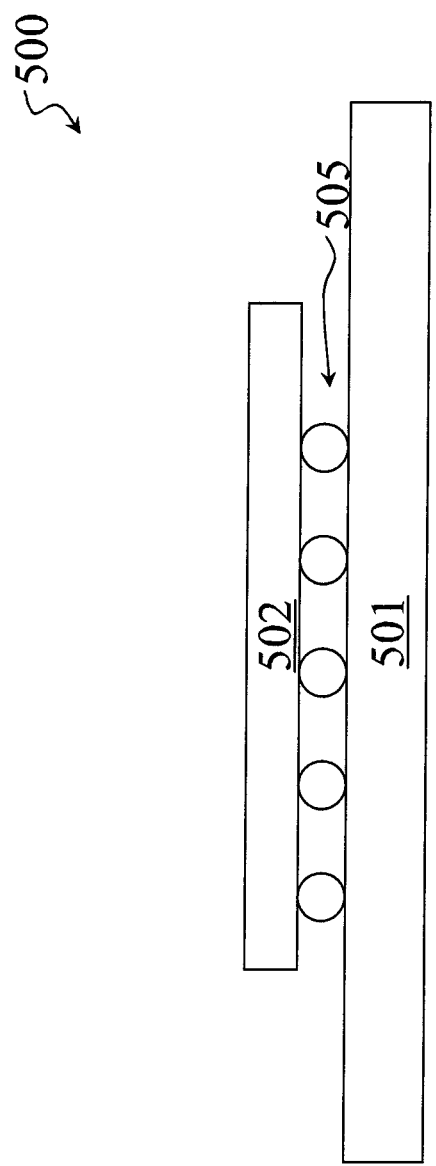
FIG. 5 is a schematic drawing illustrating a system including an exemplary integrated circuit disposed over a substrate board.

FIG. 5 is a schematic drawing illustrating a system including an exemplary an integrated circuit disposed over a substrate board. In FIG. 5, a system 500 can include an integrated circuit 502 disposed over a substrate board 501. The substrate board 501 can include a printed circuit board (PCB), a printed wiring board and/or other carrier that is capable of carrying an integrated circuit. In some embodiments, the integrated circuit 502 can be similar to one of the integrated circuits 100, 200, and 400 described above in conjunction with FIGS. 1-2 and 4, respectively. The integrated circuit 502 can be electrically coupled with the substrate board 501. In some embodiments, the integrated circuit 502 can be electrically and/or thermally coupled with the substrate board 501 through bumps 505. The system 500 can be part of an electronic system such as displays, panels, lighting systems, auto vehicles, entertainment devices, or the like. In some embodiments, the system 500 including the integrated circuit 502 can provides an entire system in one IC, so-called system on a chip (SOC) or system on integrated circuit (SOIC) devices.

An aspect of this description relates to an integrated circuit for converting a high voltage level to a low voltage level that comprises a high side driver, a low side driver electrically coupled with the high side driver, a circuit electrically coupled with the high side driver and a first node between the high side driver and the low side driver, and a false signal filter electrically coupled with the circuit. The circuit is configured to substantially turn off the high side driver if the high side driver leaves a cutoff region of the high side driver during a tri-state mode. The false signal filter is configured to screen signals that are outside of the tri-state mode.

Another aspect of this description relates to an integrated circuit for converting a high voltage level to a low voltage level. The integrated circuit comprises a high side driver electrically coupled with a power line that is configured to provide a first power voltage. The integrated circuit also comprises a low side driver electrically coupled with the high side driver and a power line that is configured to provide a second power voltage. The integrated circuit further comprises an inductor electrically coupled with a first node between the high side driver and the low side driver. The integrated circuit additionally comprises a capacitor electrically coupled with the inductor.

The integrated circuit also comprises a sensing circuit electrically coupled with the high side driver and the first node, the sensing circuit being configured to sense if the high side driver leaves a cutoff region of the high side driver during the tri-state mode. The integrated circuit further comprises a control circuit electrically coupled with the sensing circuit, the control circuit being configured to turn off the high side driver if the high side driver leaves the cutoff region during the tri-state mode. The integrated circuit additionally comprises a false signal filter electrically coupled with the sensing circuit and the control circuit, the false signal filter being configured to screen signals that are outside of the tri-state mode.

A further aspect of this description relates to an integrated circuit for converting a high voltage level to a low voltage level. The integrated circuit comprises a high side driver electrically having a gate, the high side driver being coupled with a power line that is configured to provide a first power voltage. The integrated circuit also comprises a low side driver electrically coupled with the high side driver and a power line that is configured to provide a second power voltage. The integrated circuit further comprises an inductor electrically coupled with a first node between the high side driver and the low side driver. The integrated circuit additionally comprises a capacitor electrically coupled with the inductor.

The integrated circuit also comprises a circuit electrically coupled with the first node and the high side driver. The circuit comprises a first transistor having a gate and a source, the gate of the transistor being electrically coupled with the first node and the source of the transistor being electrically coupled with the gate of the high side driver. The circuit also comprises a first switch electrically coupled between the first transistor and the power line that is configured to provide a second power voltage. The integrated circuit further comprises a false signal filter electrically coupled with the circuit via the first switch, the false signal filter being configured to screen signals that are outside of the tri-state mode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit for converting a high voltage level to a low voltage level, the integrated circuit comprising:
   a high side driver;
   a low side driver electrically coupled with the high side driver;
   a circuit electrically coupled with the high side driver and a first node between the high side driver and the low side driver, the circuit being configured to substantially turn off the high side driver if the high side driver leaves a cutoff region of the high side driver during a tri-state mode; and
   a false signal filter electrically coupled with the circuit, the false signal filter being configured to screen signals that are outside of the tri-state mode.

2. The integrated circuit of claim 1, wherein the circuit comprises:
   a sensing circuit electrically coupled with the high side driver and the first node, wherein the sensing circuit is configured to sense if the high side driver leaves the cutoff region of the high side driver during the tri-state mode; and
   a control circuit electrically coupled with the sensing circuit, wherein the control circuit is configured to control the high side driver corresponding to the sensing result from the sensing circuit during the tri-state mode.

3. The integrated circuit of claim 2, wherein the sensing circuit comprises:
   a first current mirror; and
   a first transistor electrically coupled with the first current mirror and the first node, wherein a gate of the first transistor is electrically coupled with a gate of the high side driver; and
   a second transistor electrically coupled with the first current mirror and the control circuit.

4. The integrated circuit of claim 1, wherein the circuit comprises:
   a transistor, wherein a gate of the transistor is electrically coupled with the first node, and a source of the transistor is electrically coupled with a gate of the high side driver; and
   a switch electrically coupled with a drain of the transistor.

5. The integrated circuit of claim 3, wherein the control circuit comprises:
   a second current mirror electrically coupled with the sensing circuit and a gate of the high side driver; and
   a switch electrically coupled with a second node between the second current mirror and the sensing circuit, wherein the switch is configured to electrically couple the second node with a ground voltage during a non-tri-state mode.

6. The integrated circuit of claim 1, wherein the false signal filter comprises:
   a pair of inverters;
   a first AND gate electrically coupled with output ends of the inverters;
   a delay circuit electrically coupled with an output end of the first AND gate; and
   a second AND gate electrically coupled with an output end of the delay circuit and the output end of the first AND gate.

7. The integrated circuit of claim 1, wherein the false signal filter comprises:
   a NAND gate;
   a delay circuit electrically coupled with an output end of the NAND gate; and
   an AND gate electrically coupled with an output end of the delay circuit and the output end of the NAND gate.

8. An integrated circuit for converting a high voltage level to a low voltage level, the integrated circuit comprising:
   a high side driver electrically coupled with a power line that is configured to provide a first power voltage;
   a low side driver electrically coupled with the high side driver and a power line that is configured to provide a second power voltage;

an inductor electrically coupled with a first node between the high side driver and the low side driver;

a capacitor electrically coupled with the inductor;

a sensing circuit electrically coupled with the high side driver and the first node, the sensing circuit being configured to sense if the high side driver leaves a cutoff region of the high side driver during a tri-state mode;

a control circuit electrically coupled with the sensing circuit, the control circuit being configured to turn off the high side driver if the high side driver leaves the cutoff region during the tri-state mode; and a false signal filter electrically coupled with the sensing circuit and the control circuit, the false signal filter being configured to screen signals that are outside of the tri-state mode.

9. The integrated circuit of claim 8, wherein the sensing circuit comprises:
a first current mirror;
a first transistor electrically coupled with the first current mirror and the first node, wherein a gate of the first transistor is electrically coupled with a gate of the high side driver; and
a second transistor electrically coupled with the first current source and the control circuit.

10. The integrated circuit of claim 8, the sensing circuit comprising:
a transistor, wherein a gate of the transistor is electrically coupled with the first node, and a source of the transistor is electrically coupled with a gate of the high side driver; and
a switch electrically coupled with a drain of the transistor.

11. The integrated circuit of claim 9, wherein the control circuit comprises:
a second current mirror electrically coupled with the sensing circuit and a gate of the high side driver; and
a switch electrically coupled with a second node between the second current mirror and the sensing circuit, wherein the switch is configured to electrically couple the second node with a ground voltage during a non-tri-state mode.

12. The integrated circuit of claim 8, wherein the false signal filter comprises:
a pair of inverters;
a first AND gate electrically coupled with output ends of the inverters;
a delay circuit electrically coupled with an output end of the first AND gate; and
a second AND gate electrically coupled with an output end of the delay circuit and the output end of the first AND gate.

13. The integrated circuit of claim 8, wherein the false signal filter comprises:
a NAND gate;
a delay circuit electrically coupled with an output end of the NAND gate; and
an AND gate electrically coupled with an output end of the delay circuit and the output end of the NAND gate.

14. An integrated circuit for converting a high voltage level to a low voltage level, the integrated circuit comprising:
a high side driver electrically having a gate, the high side driver being coupled with a power line that is configured to provide a first power voltage;
a low side driver electrically coupled with the high side driver and a power line that is configured to provide a second power voltage;
an inductor electrically coupled with a first node between the high side driver and the low side driver;
a capacitor electrically coupled with the inductor;
a circuit electrically coupled with the first node and the high side driver, the circuit comprising:
a first transistor having a gate and a source, the gate of the transistor being electrically coupled with the first node and the source of the transistor being electrically coupled with the gate of the high side driver; and
a first switch electrically coupled between the first transistor and the power line that is configured to provide the second power voltage; and
a false signal filter electrically coupled with the circuit via the first switch, the false signal filter being configured to screen signals that are outside of a tri-state mode.

15. The integrated circuit of claim 14, wherein the circuit is configured to substantially turn off the high side driver if the high side driver leaves a cutoff region of the high side driver during the tri-state mode.

16. The integrated circuit of claim 14, wherein the circuit further comprises:
a sensing circuit electrically coupled with the high side driver and the first node, wherein the sensing circuit is configured to sense if the high side driver leaves the cutoff region of the high side driver during the tri-state mode; and
a control circuit electrically coupled with the sensing circuit, wherein the control circuit is configured to control the high side driver corresponding to the sensing result from the sensing circuit during the tri-state mode.

17. The integrated circuit of claim 16, wherein the sensing circuit comprises:
a first current mirror; and
a first transistor electrically coupled with the first current mirror and the first node, wherein a gate of the first transistor is electrically coupled with a gate of the high side driver; and
a second transistor electrically coupled with the first current mirror and the control circuit.

18. The integrated circuit of claim 17, wherein the control circuit comprises:
a second current mirror electrically coupled with the sensing circuit and a gate of the high side driver; and
a second switch electrically coupled with a second node between the second current mirror and the sensing circuit, wherein the second switch is configured to electrically couple the second node with a ground voltage during a non-tri-state mode.

19. The integrated circuit of claim 14, wherein the false signal filter comprises:
a pair of inverters;
a first AND gate electrically coupled with output ends of the inverters;
a delay circuit electrically coupled with an output end of the first AND gate; and
a second AND gate electrically coupled with an output end of the delay circuit and the output end of the first AND gate.

20. The integrated circuit of claim 14, wherein the false signal filter comprises:
a NAND gate;
a delay circuit electrically coupled with an output end of the NAND gate; and
an AND gate electrically coupled with an output end of the delay circuit and the output end of the NAND gate.

* * * * *